United States Patent
Kozloski et al.

(10) Patent No.: US 10,438,218 B2
(45) Date of Patent: Oct. 8, 2019

(54) SYSTEM, METHOD, AND RECORDING MEDIUM FOR RESTAURANT MANAGEMENT

(71) Applicant: International Business Machines Corporation, Armonk, NY (US)

(72) Inventors: James Robert Kozloski, New Fairfield, CT (US); Clifford A. Pickover, Yorktown Heights, NY (US); John Jeremy Rice, Mohegan Lake, NY (US); Jane J. Yu, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 293 days.

(21) Appl. No.: 15/190,786

(22) Filed: Jun. 23, 2016

(65) Prior Publication Data
US 2017/0372335 A1    Dec. 28, 2017

(51) Int. Cl.
*G06Q 30/02* (2012.01)
*G06Q 50/12* (2012.01)
*G06F 11/30* (2006.01)

(52) U.S. Cl.
CPC ..... *G06Q 30/0202* (2013.01); *G06Q 30/0201* (2013.01); *G06Q 50/12* (2013.01)

(58) Field of Classification Search
USPC .......................................................... 705/15
See application file for complete search history.

(56) References Cited

U.S. PATENT DOCUMENTS

| | | | | |
|---|---|---|---|---|
| 7,860,862 B2* | 12/2010 | Slaney | ................ | G06Q 30/02 707/736 |
| 8,209,219 B2* | 6/2012 | Fitzpatrick | ............ | G06Q 10/04 705/15 |
| 2005/0065851 A1 | 3/2005 | Aronoff et al. | | |
| 2005/0154560 A1* | 7/2005 | Fitzpatrick | ............ | G06Q 10/06 702/182 |
| 2011/0282823 A1* | 11/2011 | Yahia | .................... | G06N 5/022 706/50 |
| 2013/0103452 A1 | 4/2013 | Burks et al. | | |
| 2014/0344016 A1 | 11/2014 | Hanson | | |
| 2015/0006243 A1 | 1/2015 | Yuasa | | |
| 2016/0034902 A1 | 2/2016 | Bernstein | | |

FOREIGN PATENT DOCUMENTS

JP    2002-123586 A    4/2002

OTHER PUBLICATIONS

IBM. "Method and process for creating "Eat Smart" Quickie Business Lunches for sit-down Restaurants" IPCOM000126188D. Jul. 6, 2005.

(Continued)

*Primary Examiner* — Garcia Ade
(74) *Attorney, Agent, or Firm* — Rahan Uddin, Esq.; McGinn IP Law Group, PLLC

(57) ABSTRACT

A restaurant management method, system, and non-transitory computer readable medium, include receiving a state of a user from user data, determining a confidence value that a restaurant change results in an improvement of the state of the user, and deploying the restaurant change when the confidence value is greater than a predetermined threshold value.

15 Claims, 5 Drawing Sheets

(56) References Cited

OTHER PUBLICATIONS

"A Method and System for Performing Cognitive Analysis on Social Media Data for Alerting About Predicted Changes and Providing Recommended Actions to Relevant Parties/Entities". Disclosed Anonymously. IPCOM000244524D. Dec. 17, 2015.
"Provisioning Content Relevant to a Predicted Future Circumstance" IPCOM000207125D May 17, 2011.

* cited by examiner

RESTAURANT MANAGEMENT METHOD 200

SYSTEM, METHOD, AND RECORDING MEDIUM FOR RESTAURANT MANAGEMENT

BACKGROUND

The present invention relates generally to a restaurant management system, and more particularly, but not by way of limitation, to a system for managing a customer's subjective experience and optimizing restaurant function to increase repeat customer business.

The restaurant industry relies on repeat customers with recent studies showing that repeat customers make up seventy-one percent of sales at "quick service" restaurants, sixty-eight percent of sales at fast-casual operations, sixty-four percent at casual-dining establishments, sixty-three percent at family-dining eateries, and fifty-one percent at fine-dining restaurants.

Conventional restaurant management techniques have considered leveraging machine learning to improve individual recipes, but have not considered techniques to improve the overall restaurant management structure to optimize human subjective experience, thereby to cause customers to return. That is, there is a need in the art to provide optimization techniques to increase the likelihood of repeat customers.

SUMMARY

In view of the long-felt need in the restaurant industry, or more generally, in the service industry, the inventors have considered a non-abstract improvement via a technical solution in which a system can optimize a customer's experience using, for example, advanced analytics, prediction, automated inventory, recipe deployment, and server behavior in a restaurant. More particularly, the invention makes use of Private Cognitive Event Predictors (PCEPs) as a useful facilitating technology in this method's architecture. Using real-time measurement of a customer's subjective experience (indicated by the customer or inferred), the system can deploy server actions, recipe adjustments, supply orders automatically, adjust lighting, ambience, etc. to increase and/or achieve repeat customership.

In an exemplary embodiment, the present invention can provide a restaurant management system, including a user state receiving circuit configured to receive a state of a user from user data, a determining circuit configured to determine a confidence value that a restaurant change results in an improvement of the state of the user, and a change deploying circuit configured to deploy the restaurant change when the confidence value is greater than a predetermined threshold value.

Further, in another exemplary embodiment, the present invention can provide a restaurant management method, including receiving a state of a user from user data, determining a confidence value that a restaurant change results in an improvement of the state of the user, and deploying the restaurant change when the confidence value is greater than a predetermined threshold value.

Even further, in another exemplary embodiment, the present invention can provide a non-transitory computer-readable recording medium recording a restaurant management program, the program causing a computer to perform: receiving a state of a user from user data, determining a confidence value that a restaurant change results in an improvement of the state of the user, and deploying the restaurant change when the confidence value is greater than a predetermined threshold value.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

Figure 1:
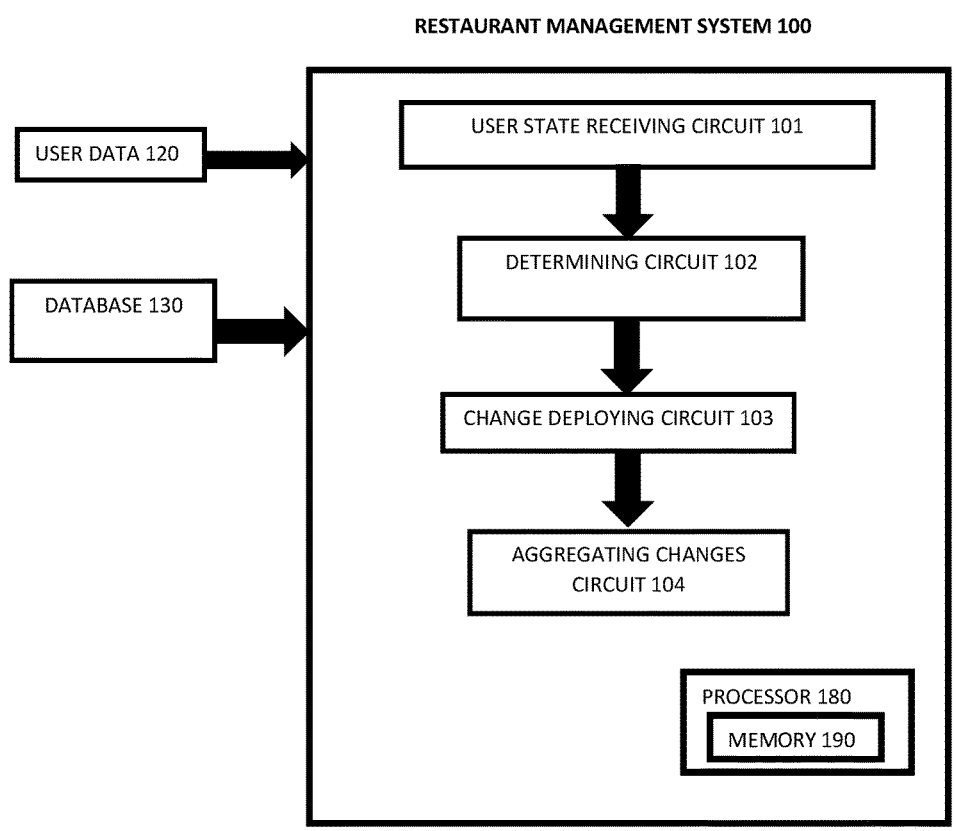
FIG. 1 exemplarily shows a block diagram illustrating a configuration of a restaurant management system 100.

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the restaurant management system 100 includes a user state receiving circuit 101, a determining circuit 102, a change deploying circuit 103, and an aggregating changes circuit 104. The restaurant management system 100 includes a processor 180 and a memory 190, with the memory 190 storing instructions to cause the processor 180 to execute each circuit of the restaurant management system 100. The processor and memory may be physical hardware components, or a combination of hardware and software components.

Although the restaurant management system 100 includes various circuits, it should be noted that a restaurant management system can include modules in which the memory 190 stores instructions to cause the processor 180 to execute each module of the restaurant management system 100.

Also, each circuit can be a stand-alone device, unit, module, etc. that can be interconnected to cooperatively produce a transformation to a result.

With the use of these various circuits, the restaurant management system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Cognitive states are defined as functions of measures of a user's total behavior collected over some period of time from at least one personal information collector (e.g., including musculoskeletal gestures, speech gestures, eye movements, internal physiological changes, measured by imaging circuits, microphones, physiological and kinematic sensors in a high dimensional measurement space, etc.) within a lower dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower dimensional feature space, is used to identify the emergence of a certain cognitive state(s) over that period of time. One or more exemplary embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a "cognitive state". The present application also describes the analysis, categorization, and identification of these cognitive states further feature analysis of subgraphs, including dimensionality reduction of the subgraphs, for example graphical analysis, which extracts topological features and categorizes the resultant subgraph and its associated feature nodes and edges within a subgraph feature space.

Figure 3:
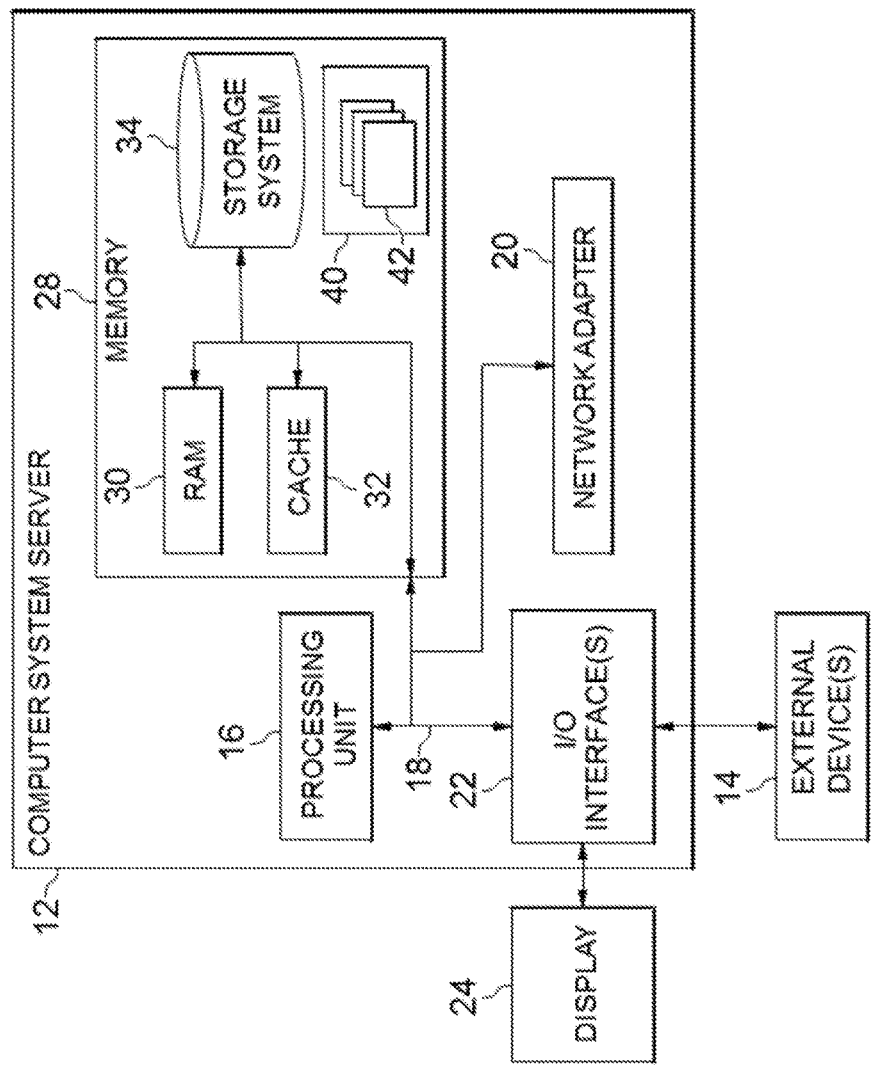
FIG. 3 depicts a cloud computing node 10 according to an exemplary embodiment of the present invention.
Figure 4:
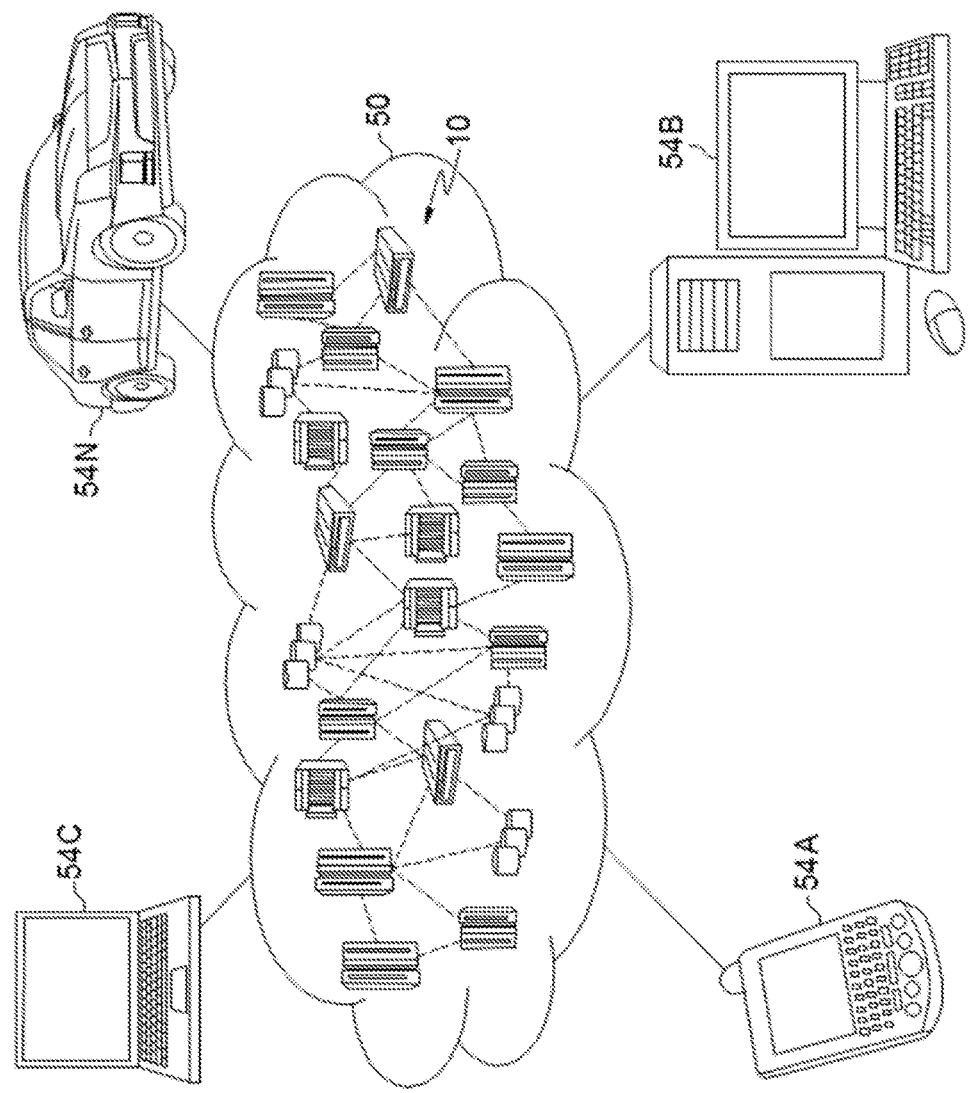
FIG. 4 depicts a cloud computing environment 50 according to another exemplary embodiment of the present invention.
Figure 5:
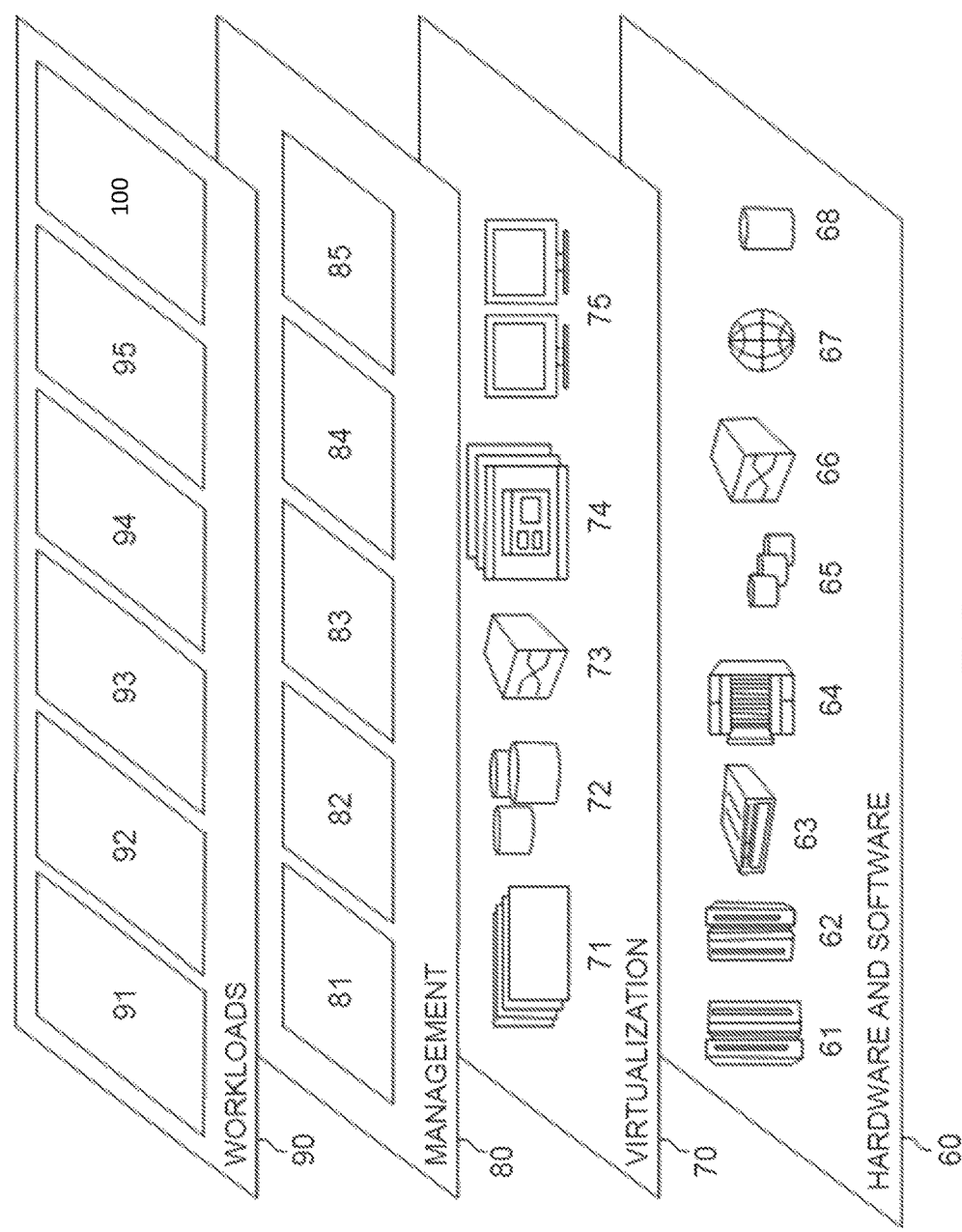
FIG. 5 depicts abstraction model layers according to an exemplary embodiment of the present invention.

Although as shown in FIGS. 3-5 and as described later, the computer system/server 12 is exemplarily shown in cloud computing node 10 as a general-purpose computing circuit which may execute in a layer the restaurant management system 100 (FIG. 5), it is noted that the present invention can be implemented outside of the cloud environment.

The user state receiving circuit 101 receives a state of the user(s) from a user wearable device(s), such as physiological monitors (e.g., heart rate, biometrics, etc.), video data (e.g., facial expression recognition, motion recognition, etc.), sound and speech analytics (e.g., laughter, anger, frustrated state determined from speech or sound), table contact sensors such as cutlery, plates, glasses, etc. Users can choose to share information via wireless devices with trusted restaurants to alert restaurants to typical orders, desired seating or servers, special needs, diet restriction, etc. The state of the user comprises a "happiness" value or a "satisfaction" value indicating how the user is subjectively feeling about the experience at the restaurant.

In some embodiments, the state of the user can be an aggregate of more than one user such as two people dining together, a family, a business group, etc. User crowdsourcing through voting/indications (e.g. by pressing a button on a wearable or device) also can be received by the user state receiving circuit 101.

The determining circuit 102 determines, with a confidence value, that a restaurant change will improve the state of the user (e.g., improve the user's satisfaction with the restaurant). It is noted that the improvement of the state of the user refers to, for example, the user's likelihood to return to the restaurant based on the change.

For example, the determining circuit 102 can determine if the restaurant change will improve the state of the user by, for example, a Private Cognitive Event Predictor (PCEP) reverse correlating a user's indication with actions and measures that led up to it (for example, a user's rating on a website, a user's returning to the store, a user's complaint, etc.), applying predictive analytics to customer measures, a Kalman (or related) filter, an aggregation of objective data such as time in a restaurant, repeated orders, dollars spent, propensity of the customer to bring new diners (i.e., friends and business clients, etc.), or the like.

The PCEP information for an individual or group may be processed into useful metrics, such as those relating to various categories of restaurant staffing, efficiency, performance, and quality. The useful metrics can be displayed as a human-readable chart, graph or report. The data can be processed in real time, permitting managers to promptly make adjustments and to alert restaurant workers or crew members of deficiencies so that prompt and effective remedial action can be taken to improve restaurant performance. Reports may be generated that provide the performance of restaurants individually and as a combined group.

In some embodiments, an interactive local and wide area network interface (e.g., via the database 130) can be used for communications between PCEP elements, the restaurant service elements providing service to a customer and for recording of selected related service data for real-time information and for review and analysis and for management control. Here, the term "management" may refer to people, AI agents, and collections of people and AI agents, which may collaborate.

That is, the determining circuit 102 determines if (and how much) a restaurant change can improve the state of the user. For example, if the state of the user is received as having a low heart rate indicating a lower satisfaction level with the dining experience, the determining circuit 102 can determine, with a confidence level, if a change in the music of the restaurant or bringing out a larger portion for the main course would change the state of the user. The highest confidence level determined by the determining circuit 102 would indicate that the change would most likely cause the state of the user to be better.

The change can be determined by the determining circuit 102 by reverse correlating changes that improved the customer measure in the past.

The change deploying circuit 103 deploys a restaurant change based on the determining circuit 102 determining that the restaurant change would increase the state of the user. Preferably, the change deploying circuit 103 deploys the restaurant change when the confidence level for a change to the state of the user is greater than a threshold value. The threshold value can be set by each owner of the system 100. For example, the threshold value can be 60%, 80%, etc. depending upon the owner's requirements and restrictions.

Thus, the change deploying circuit 103 can eliminate minor restaurant changes from being deployed or restaurant changes from being deployed that have a low chance of increasing the state of the user.

The restaurant change can include, for example, sending a server to the table to refill a glass, offer seasoning, provide more bread, provide more salad, etc., altering a recipe prior to cooking the customer's food, arranging seating, tables differently for a user, changing a timing of a check delivery, changing the timing of checking-up on customer well-being, changing the lighting (including candles, shading, etc.), choosing of a table based on crowding, nearness to music, nearness to lights, nearness to walls, nearness to a center of room, nearness to live music, etc., changing a portion size based on the desirability or need for taking home leftovers (and how these are packaged), the need for menus with larger fonts, ambient musical selections (when appropriate), the suggestion of a dessert, the suggestion of an alternate menu, the suggestion of a possible dining partner (e.g. for a single person), the suggestion for the use of a certain waiter, etc.

It is noted that the change deploying circuit 103 deploys the restaurant changes in real-time while the user is still in the restaurant experience. Also, the restaurant changes can be stored in a database 130.

The customer's wearable device(s) can be used to reverse correlate changes with customer satisfaction (e.g., provide feedback to the change deploying circuit 103 based on the change).

However, the aggregating changes circuit 104 aggregates all past changes (e.g., as found in the database 130) by the change deploying circuit 103 and dynamically schedules future restaurant changes.

That is, when fully functioning in a restaurant environment, a user may be expected to return to the restaurant. By the aggregating changes circuit 104 aggregating these expectations and determining aggregate restaurant change scheduled for any given day, pre-ordering of supplies needed to meet users' needs on that day is deployed. In addition, seating and other restaurant changes may be ordered for a day in order to optimally match the aggregate customer needs. In other words, change deploying circuit 103 deploys changes to cause the user to return to the restaurant. The aggregating changes circuit 104 aggregates the changes for all users and determines a restaurant change schedule such that when the user returns, the restaurant is capable of providing the same change.

Also, based on the aggregating changes circuit 104 aggregating the changes, pre-deployed changes may involve the shaping of real-time advertisements, e.g. advertisements on the Web, in a store window display, on a billboard, etc. Note that as the population ages, considerations of noise, lighting, and other factors may become more important for a range of service industries, such as restaurants. Thus, changes may involve such kinds of considerations.

Moreover, the user state receiving circuit 101 can receive changes in the state of user based on a change deployed by the change deploying circuit 103 (as described later) and factor the change into the user state. For example, if the change deploying circuit 103 pushes information to the users such as a special on roasted duck, half-off on beef dishes, etc. either as an e-coupon broadcast to all diners or as a directed promotion, the user state receiving circuit 101 will receive the updated state of the user and track if the state of the user increased or decreased based on the deployed change by the change deploying circuit 103.

Figure 2:
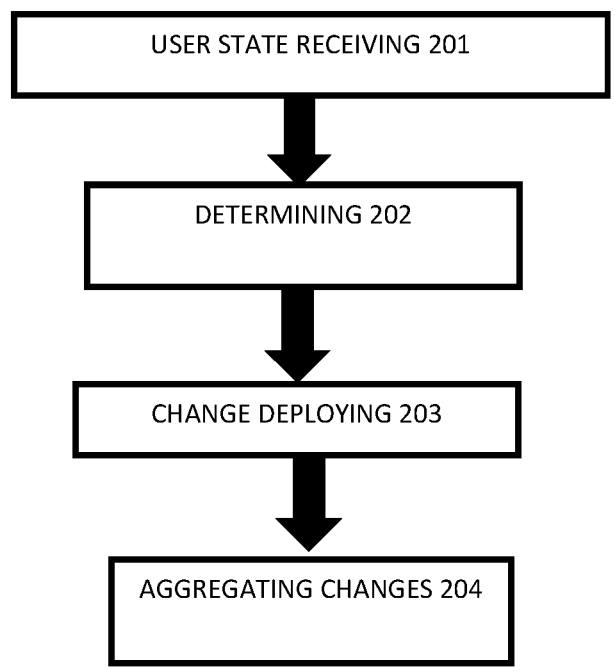
FIG. 2 exemplarily shows a high level flow chart for a restaurant management method 200.

FIG. 2 shows a high level flow chart for a method 200 of restaurant management.

Step 201 receives a state of the user(s) from a user wearable device(s), such as physiological monitors (e.g., heart rate, biometrics, etc.), video data (e.g., facial expression recognition, motion recognition, etc.), sound and speech analytics (e.g., laughter, anger, frustrated state determined from speech or sound), table contact sensors such as cutlery, plates, glasses, etc. Users can choose to share information via wireless devices with trusted restaurants to alert restaurants to typical orders, desired seating or servers, special needs, diet restriction, etc.

Step 202 determines, with a confidence value, that a restaurant change will improve the state of the user (e.g., improve the user's satisfaction with the restaurant).

Step 203 deploys a restaurant change based on Step 202 determining that the restaurant change would increase the state of the user. Preferably, Step 203 deploys the restaurant change when the confidence level for a change to the state of the user is greater than a threshold value.

Step 204 aggregates all past changes (e.g., as found in the database 130) by the change deploying circuit 103 and dynamically schedules future restaurant changes.

Thus, by intelligently deciding when to deploy a restaurant change based on the measured subjective state of the user, the system 100 and method 200, for example, reduces waste due to incorrect assumptions about user's needs, organizes work and actions in the restaurant to become user focused to increase user return rate, supply chain management in the restaurant can become linked to user needs, and therefore suppliers with more tenuous supply lines (e.g., local organic farmers or the like) can be managed and receive feedback from the invention to optimize resource management (e.g., harvest, delivery, etc.), utilization of the fixed assets and staff may be low or highly variable which can be optimized and balanced, reduce energy cost and utility bills by optimizing resource usage, and the aggregation of restaurant users and data may allow better supply chains and pooling of risk (e.g., may be easier to predict average needs of aggregate that would have lower variance that individual restaurants).

Also, the system 100 and method 200 can act in a cognitive manner (e.g., learn from past restaurant changes) and be useful to minimize the negative sentiment generated by portion control inventory systems. Such a cognitive system can be able quantify the degree to which a system generates negative perception and for which cohort of customers. For example, valued returning users that respond negatively to portion control may be made exempt from such systems or be given special treatment or allowed to order from special drink menus (e.g., these are hand-crafted by your favorite server). In another embodiment, an establishment could quantify the gains by portion control and the negative sentiment to decide on an optimal balance. The optimal balance could be adjusted based on time of day, events scheduled, spending habit of the current clientele, etc.

Although the embodiments discussed above are directed to the restaurant industry, the invention is not limited thereto. For example, the system 100 can be used in any service industry such as in car dealerships, healthcare facilities, barber shops, and the like. Service industries (sometimes referred to as the "tertiary sector of industry") may include the providing of services to both people and businesses. These kinds of industries include accounting, mechanic or plumber services, computer services, restaurants, tourism, child care, healthcare, legal services, etc.

In one embodiment, multiple sensor modules can be installed at each table (or chair or light fixture) of a restaurant for detecting restaurant customer service related information and PCEP information. The detected restaurant user service related information and PCEP information can be transmitted to a central computer unit (e.g., processor 180 and memory 190) having a receiver (user state receiving circuit 101) for receiving the detected restaurant customer service related information transmitted by the sensor modules. A display monitor, coupled to the central computer unit, can be utilized to display the detected restaurant customer service related information and PCEP information received by the receiver to a restaurant manager in a real-time basis, regardless of whether the restaurant manager is present at the restaurant or at a remote location. The "restaurant manager" may be an AI agent and optionally have NLP (natural language processing) componentry. As mentioned, the term "management" may refer to people, AI agents, and collections of people and AI agents, which may collaborate.

It is noted that a wireless maitre d' system (in which the agent is a human, an AI agent with optional NLP processing, or a combination of humans and AI agents) can optionally be embodied for providing interactive two-way communication between users and restaurant service personnel who have direct interaction with the users during restaurant encounters. This maitre d' system may access PCEP information and make use of wireless devices, including a user's smartphone, smart watch, Fitbit®, Google Glass®, etc. The wireless maitre d' system approach could be expanded outside the confines of the restaurant itself. That is, the user could interact with restaurant staff before traveling or on the way to the establishment. Two way communication could be used by the user to help in the decision process to find a restaurant.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 3, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the restaurant management system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A restaurant management system, comprising:
a user state receiving circuit configured to receive a state of a user from user data, the state of the user comprising a satisfaction value indicating how the user is subjectively feeling about an experience at a restaurant;
a determining circuit configured to determine a confidence value that a restaurant change results in an improvement of the state of the user that increases the satisfaction value and determines an amount that the satisfaction value is increased; and
a change deploying circuit configured to deploy the restaurant change when both of the confidence value and the increase in the satisfaction value is greater than a predetermined threshold value as set by an owner of a restaurant according to a preference of the owner,
wherein the determining circuit determines the confidence value of the restaurant change by reverse correlation and the likelihood of a restaurant change and past user data given an improvement of the state of the user, and
wherein the change is determined by reverse correlating changes that improved the state of the user in the past,
further comprising an aggregating changes circuit configured to aggregate prior restaurant changes by the change deploying circuit and dynamically schedule future restaurant changes to mimic the prior restaurant changes to result in the improvement of the state of the user for a same returning user to experience the mimicked prior restaurant changes based on a restaurant change schedule correlated to a schedule for the same returning user.

2. The system of claim 1, wherein the satisfaction value of the user indicates how the user is subjectively feeling about the restaurant as measured from the user data, and
wherein the satisfaction value of the user determines a measure of probability the user will return to the restaurant.

3. The system of claim 1, wherein the improvement comprises a probability that the user will return to a restaurant.

4. The system of claim 1, wherein the change deploying circuit deploys the restaurant change in real-time while the user is in a current restaurant experience.

5. The system of claim 1, wherein the change deploying circuit deploys the restaurant change in real-time based on a current state of the user.

6. The system of claim 1, wherein the user data comprises a satisfaction level of a current state of the user's restaurant experience.

7. The system of claim 1, wherein the user data is detected by at least one of:
a wearable device;
video data;
sound and speech analytics;
a table contact sensor; and
a sensor.

8. The system of claim 1, wherein the restaurant change comprises each of:
sending a server to a table of the user;
altering a recipe prior to cooking the user's food;
re-arranging seating;
changing a timing of a check delivery;
changing a timing of checking-up on a user's well-being;
changing a lighting;
choosing of a table based on any of crowding, nearness to music, nearness to lights, nearness to walls of the restaurant, nearness to a center of a room of the restaurant, and a nearness to live music in the restaurant;
changing a portion size based on a desirability for taking home leftovers;

a need for a menu with a different display;

a musical selection;

an alternative course suggestion; and a particular server.

9. The system of claim 1, wherein the determining circuit determines a confidence value for each of a plurality of restaurant changes, and wherein the change deploying circuit deploys a restaurant change of the plurality of restaurant changes having a highest confidence value.

10. A restaurant management method, comprising:

receiving a state of a user from user data, the state of the user comprising a satisfaction value indicating how the user is subjectively feeling about an experience at a restaurant;

determining a confidence value that a restaurant change results in an improvement of the state of the user that increases the satisfaction value and determines an amount that the satisfaction value is increased; and deploying the restaurant change when both of the confidence value and the increase in the satisfaction value is greater than a predetermined threshold value as set by an owner of a restaurant according to a preference of the owner, wherein the determining determines the confidence value of the restaurant change by reverse correlation and the likelihood of a restaurant change and past user data given an improvement of the state of the user, and wherein the change is determined by reverse correlating changes that improved the state of the user in the past, further comprising aggregating prior restaurant changes to dynamically schedule future restaurant changes to mimic the prior restaurant changes to result in the improvement of the state of the user for a same returning user to experience the mimicked prior restaurant changes.

11. The method of claim 10, wherein the improvement comprises a likelihood that the user will return to a restaurant.

12. The method of claim 10, further comprising:

aggregating all prior restaurant changes by the deploying; and dynamically scheduling future restaurant changes to result in the improvement of the state of the user.

13. The method of claim 10, further comprising:

aggregating prior restaurant changes by the deploying; and dynamically scheduling future restaurant changes when the user returns to a restaurant to result in the improvement of the state of the user.

14. The method of claim 10, wherein the state of the user comprises a satisfaction value of the user indicating how the user is subjectively feeling about the restaurant as measured from the user data, and wherein the satisfaction value of the user determines a measure of probability the user will return to the restaurant.

15. A non-transitory computer-readable recording medium recording a restaurant management program, the program causing a computer to perform:

receiving a state of a user from user data, the state of the user comprising a satisfaction value indicating how the user is subjectively feeling about an experience at a restaurant;

determining a confidence value that a restaurant change results in an improvement of the state of the user that increases the satisfaction value and determines an amount that the satisfaction value is increased; and deploying the restaurant change when both of the confidence value and the increase in the satisfaction value is greater than a predetermined threshold value as set by an owner of a restaurant according to a preference of the owner, wherein the determining determines the confidence value of the restaurant change by reverse correlation and the likelihood of a restaurant change and past user data given an improvement of the state of the user, and wherein the change is determined by reverse correlating changes that improved the state of the user in the past, further comprising aggregating prior restaurant changes to dynamically schedule future restaurant changes to mimic the prior restaurant changes to result in the improvement of the state of the user for a same returning user to experience the mimicked prior restaurant changes.

* * * * *